United States Patent Office 3,371,086
Patented Feb. 27, 1968

3,371,086
NOVEL STEROIDAL [3,2-d]-2',6'-
DIAMINOPYRIMIDINES
Leland L. Smith, Malvern, Pa., and Daniel M. Teller,
Wilmington, Del., assignors to American Home
Products Corporation, New York, N.Y., a corporation of Delaware
No Drawing. Filed Oct. 16, 1962, Ser. No. 230,999
1 Claim. (Cl. 260—239.5)

This invention relates in general to certain novel steroidal [3,2-d]-2',6'-diaminopyrimidines, methods for their manufacture and their use as therapeutically active agents. More particularly, the invention relates to the discovery of a novel class of 17-substituted androstano-[3,2-d]-2',6'-diaminopyrimidines of the general formula:

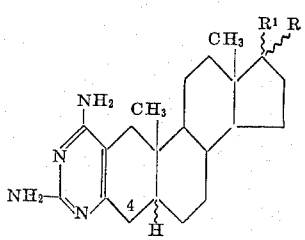

and the 4-dehydro analogs and acid addition salts thereof wherein R in the formula is representative of hydrogen or a lower alkyl radical having up to about 10 carbon atoms, such as methyl, ethyl, butyl, isobutyl, pentyl, hexyl, heptyl, octyl and the like, although methyl is the lower alkyl radical preferred; $R^1$ on the other hand represents either hydrogen, hydroxy, or an acyloxy radical wherein the acyl radical is derived from such organic acids as lower mono-, di- and polycarboxylic acids as succinic, acetic, malonic, butyric, citric, malic, benzoic and the like. Such radicals as the alkanoyl radicals of corresponding acids like acetyl, propionyl and butyryl derived from acetic, propionic and butyric acids and the like, and aroyl radicals of such acids as benzoic and the like would therefore fall within the scope of this class of substituent and are preferred.

As regards the substituent $R^1$, its attachment may be α or β as represented generally by the wavy line. The configuration will depend upon the nature of the substituents present in R and $R^1$.

Included within the invention are the acid addition salts of the above generalized group of compounds with any pharmaceutically acceptable acid such as will give rise to the corresponding acetate, citrate, benzoate, hydrochloride, nitrate, sulfate, phosphate, benzene sulfonate and the like salts.

We have discovered that the novel compounds of the foregoing structure possess anti-bacterial properties in general and further exhibit activity of a hormonal nature, particularly androgenic, in many instances, as well as having use in experimental pharmacology and as useful intermediates in the preparation of other steroids of value.

When it is desired to adapt our novel compounds to pharmacological uses they can be administered to an animal organism in the form of creams, ointments, tablets, capsules, pills, solutions, suspensions for oral or parenteral use, and the like. The compounds are generally characterized by anti-bacterial activity against gram positive or gram negative microorganisms of various types which renders them useful for topical, local or systemic administration. When applied topically the compounds may, if desired, be used in a concentration ranging from about 0.1% to about 2.0% by weight in the form of dusting powders, troches, sprays, drops, suppositories, aqueous or oil dispersions or in the form of ointments, creams, water-oil emulsions, and lotions. For local treatment therefore they would be expected to be useful in combating gastro-intestinal infections. The usual excipients such as carboxymethylcellulose, lactose, starch, and the like can be used where conventional compounding procedures and binders are employed to form tablets and pills. The general dosage range of such internal administration will vary with the age, degree of infection, etc. of the subject to be treated but will generally be in excess of about 200 mg./kilo of body weight per day.

The starting materials employed for the preparation of these novel compounds are generally 3-ketosteroids, particularly 4,5α-dihydro-3-ketosteroids such as 4,5α-dihydrotesterone, 17α-methyl - 4,5α-dihydrotestosterone, 5α-cholestan-3-one and the like, to name a few selected members of the broad class of such compounds.

In general, the reaction which leads to the preparation of these novel anti-bacterial agents involves a fusion reaction between cyanoguanidine and an appropriate cyclic ketosteroid of the type illustrated above. In most cases the cyanoguanidine may be admixed with the steroidal 3-ketone and the resulting mixture heated for ½ hour or more at temperatures of the order of 200–300° C. If desired, suitable inert solvents of a broad class of such solvents, such as nitrobenzene, phenyl ether, amyl ether, and the like may be added to the reaction mixture in order to reflux off the water formed during the reaction and lower the temperature of the reaction. After the product desired has been obtained in crude form, it may be purified by conventional techniques, such as washing with water followed by recrystallization from such organic solvents as ethanol and butanol, to name a few of the available solvents generally employed for this purpose.

The novel compounds of the invention may also be prepared by reaction of a compound such as guanidine with a steroid such as a 2-cyano-3-ketosteroid such as 2-cyano-4,5-dihydro-testosterone or the like in the presence of an inert solvent at reaction temperatures ranging from 100–200° for up to 12 hours reaction time. Still further, one may react a compound such as 2-cyano-4,5-dihydrotestosterone or the like with urea to form the 6'-amino-2'-hydroxy substituted analog which is further treated with a suitable halogenating agent such as $POCl_3$ to produce the 6'-amino - 2'-halogeno analog which is treated in a final step with ammonia to obtain the novel steroidal [3,2-d]-2',6'-diaminopyrimidine compounds of the invention.

In a still further method of preparation a steroid such as 2-dichloromethyl-4,5-dihydrotestosterone or the like may be reacted in the presence of a suitable organic solvent at room temperature with guanidine to form the 2'-amino-6'-chloro-substituted analog in a first step which is then treated with ammonia to form the compounds of the invention wherein $R^1$ is hydroxy and R is hydrogen.

The steroidal diaminopyrimidines derived from the reaction absorb characteristically near 283–284 millimicrons, and also near 230 millimicrons on the spectrum when tested in ethanol. For the dihydrotestosterone derivatives the spectra are not materially changed in alkaline ethanol; however, in acidified ethanol the 230 millimicron band is missing and the 284 millimicron band is shifted to 273 millimicrons.

As a specific example, the fusion reaction may be conducted in a reaction vessel heated in an oil bath at temperatures ranging from about 200–250° C. with air being displayed by nitrogen. The melted steroid and cyanoguanidine are miscible in most cases though in some cases phase separation may tend to occur. The reaction product solidifies upon cooling and is removed, ground, washed with water to remove melamine which is also formed in the reaction and is purified in the manner indicated above.

As illustrative of the anti-bacterial utility of the compounds produced as described above, two representative compounds were tested in vitro, one wherein $R^1$ is hydroxyl and R is hydrogen (represented by Compound A in the table below) and one wherein R is methyl and $R^1$ is hydroxyl (represented by Compound B in the table below). These were tested against a variety of bacteria as shown for bacteriocidal effect and bacteriostatic and antimicrobial activity. The results are tabulated as follows in Table I:

TABLE I.—ANTIMICROBIAL ACTIVITY OF CERTAIN STEROIDAL [3,2-d]-2',6'-DIAMINOPYRIMIDINES

| Test Organism | Minimum Inhibitory Concentration, μg./ml. | |
|---|---|---|
| | A | B |
| Staphylococcus aureus 209P | 31.3 | 100 |
| Staphylococcus aureus 53–180 | 250 | 100 |
| Staphylococcus aureus CHP | 250 | |
| Staphylococcus aureus Smith | 31.3 | |
| Streptococcus pyrogenes Group A | 31.3 | |
| Diplococcus pneumoniae 37 | 31.3 | |
| Sarcina lutea | 31.3 | |
| Gaffyka tetragena | 31.3 | |
| Salmonella paratyphi | 250 | 100 |
| Brucella bronchiseptica | 500 | 100 |
| Neisseria catarrhalis | 250 | 500 |
| Lactobacillus casei | 50 | 50 |
| Bacillus subtilis 6633 | 25 | 50 |
| Bacillus subtilis SR | 250 | 1,000 |
| Mycobacterium sp | 25 | |

Activity is illustrated in the above table wherein the tubulated numerical values are the results of standard anti-microbial screening carried out by incorporating the test compound in agar in Petri dishes at concentrations of 1000, 500, 250, 125, 62.5, 31.3, 15.6, 7.8, 3.9, and 1.95 mcg. per ml., and inoculating suspensions of microbial pathogens on the agar surface. The degree of inhibition of growth is observed after 18 hours. Plain agar controls are also inoculated with the test organisms and the results compared.

The term "minimum inhibitory concentration" as employed in the table above refers to the minimum amount of the particular microorganism inoculated upon the surface of a Petri plate as indicated below. The measure of the value is taken after 18 hours at 28° C., and it represents the level at which the compounds prevent further growth of the microorganism.

In the above table the bacteria tested are cultured in an agar slant which is incubated at 37° C. for a period of 18–24 hours. From the stock slant obtained a subculture is made into a brain-heart infusion broth. The vessel containing the broth is incubated at 37° C. for an additional 18 hours. The broth formula is as follows:

| Ingredient: | G./liter |
|---|---|
| Calf brain infusion liquid | 200.0 |
| Beef heart infusion liquid | 250.0 |
| Peptone | 10.0 |
| NaCl | 5.0 |
| Disodium phosphate | 2.5 |
| Dextrose | 2.0 |

The test organisms thus cultured are inoculated on the surface of the agar plates containing various concentrations of the compounds to be tested for activity.

The following examples describe in detail compounds illustrative of the present invention and methods for their manufacture. However, the invention is not to be construed as limited thereby either in spirit or in scope since it will be apparent to those skilled in the art of organic synthesis that many modifications both of materials and of methods may be practiced without departing from the purpose and intent of the disclosure. In the examples, except as otherwise noted, the temperatures are expressed in degrees centigrade and relative amounts of materials in parts by weight.

EXAMPLE 1

*17β-hydroxy-5α-androstano-[3,2-d]-2',6'-diaminopyrimidine*

Mix 1.0 g. of 4,5α-dihydrotestosterone with 400 mg. of cyanoguanidine and place in an oil bath preheated to 230°. The material melts in a few minutes and may be heated at 230–250° for 30 minutes, during which time bubbles evolve. Powder the cooled mass, wash with water, and dry, yielding 1.275 g., $\lambda_{max.}$ 284 mμ ($\epsilon$ 5,000). Dissolve the solids in ethanol, precipitate with water, and dry the product over phosphorus pentoxide, yielding 990 mg. of material with $\lambda_{max.}$ 284 mμ ($\epsilon$ 5,160), redissolve in tetrahydrofuran and reprecipitate with water. Extract the white solids with boiling benzene, and evaporate the filtered extracts under vacuum. Dry the pure product thoroughly over phosphorus pentoxide under vacuum, M.P. 190°, and at 272–278° dec. (with shrinking and coloration from 243°); $\lambda_{max.}$ 284 mμ ($\epsilon$ 4,830), 230 mμ ($\epsilon$ 8,340); $\lambda_{min.}$ 256 mμ ($\epsilon$ 1,520), 224 mμ ($\epsilon$ 8,240);

$\lambda_{max.}^{EtOH-HCl}$ 273 mμ ($\epsilon$ 4,520); $\lambda_{min.}$ 256 mμ ($\epsilon$ 3,740);

$\lambda_{max.}^{KBr}$ 2.90 (shoulder), 3.0.1, 3.17, 6.21, 6.32, 6.38, 6.95, 9.50, 9.75, 12.20μ, etc.

*Analysis.*—Calcd. for $C_{21}H_{32}ON_4$: C, 70.75; H, 9.05; N, 15.72. Found: C, 70.20; H, 9.07; N, 13.41.

EXAMPLE 2

*17β-hydroxy-17α-methyl-5α-androstano-[3,2-d]-2',6'-diaminopyrimidine*

Mix 2.0 g. of 17α-methyl-4,5α-dihydrotestosterone and 1.0 g. of cyanoguanidine in a test tube and place in an oil bath preheated to 175°. Continue heating as the materials melt at 187–200°. At 220° bubbles evolve from the reaction melt, and heating continues for thirty minutes. Grind the cooled melt, 2.61 g., and extract with benzene in a Soxhlet extractor for several days. Take six separate extracts yielding on evaporation the purified pyrimidine, 1.885 g., M.P. 247–250° dec. (shrinking and coloration from 172°); $\lambda_{max.}$ 284 mμ ($\epsilon$ 5,000–5,300). After dissolving in ethanol, precipitation with water, drying, re-extraction into benzene, evaporation, and thorough drying over phosphorus pentoxide, the product melts 246–249° dec. (shrinking and coloration from 180°); $[\alpha]_D +16°$ (1% EtOH): $\lambda_{max.}$ 284 mμ ($\epsilon$ 5,440), 230 mμ ($\epsilon$ 9,650, shoulder); $\lambda_{min.}$ 254 mμ ($\epsilon$ 1,970);

$\lambda_{max.}^{EtOH-HCl}$ 273 mμ ($\epsilon$ 5,330); $\lambda_{min.}$ 257 mμ ($\epsilon$ 4,280);

$\lambda_{max.}^{KBr}$ 2.87 (shoulder), 3.00, 3.17, 3.45, 3.52 (shoulder), 6.19, 6.29, 6.39, 6.95, 9.19, 10.72, 12.69μ, etc.

*Analysis.*—Calcd. for $C_{22}H_{34}ON_4$: C, 71.31; H, 9.24; N, 15.12. Found: C, 71.67; H, 8.57; N, 13.57.

EXAMPLE 3

*5α-cholestano-[3,2-d]-2',6'-diaminopyrimidine*

Heat a mixture of 1.0 g. of 5α-cholestan-3-one and 0.25 g. of cyanoguanidine at 250° under nitrogen with vigorous stirring. After melting, two phases form. After fifteen minutes add an additional 0.25 g. of cyanoguanidine and continue heating for fifteen minutes. Wash the cooled reaction mixture (1.0 g.) with 100 ml. of hot water twice, yielding 0.91 g. of yellow solids, M.P. 200–208° (softening from 100°);

$\lambda_{max.}^{Me_2SO}$ 298 mμ ($\epsilon$ 6,730);

$\lambda_{max.}^{KBr}$ 3.05, 3.20, 5.85 (residual 5α-cholestanone), 6.17, 6.39, 6.97μ, etc. Thin-layer chromatography (5% ethyl acetate in hexane) using 25% antimony trichloride in chloroform for detection indicates the single product ($R_F$ 0.48) together with unaltered 5α-cholestanone.

EXAMPLE 4

*17β-hydroxy-4-androsteno-[3,2-d]-2',6'-diaminopyrimidine*

Heat a mixture of 5.0 g. of testosterone and 2.0 g. of cyanoguanidine at 250° for 30 minutes under nitrogen with vigorous stirring. The mixture melts after about 3 minutes, but solidifies after about 20 minutes of heating. Cool, and then extract the red-brown solids twice with 500 ml. portions of hot water, leaving 5.0 g. of residue. Then extract twice with 500 ml. portions of boiling benzene. On cooling, the benzene extracts deposit 1.55 g. of product. Dissolve 200 mg. of this material in hot water acidified to pH 1 with hydrochloric acid and filter hot. Cool the filtrate to 0° and adjust to pH 9 with ammonium hydroxide, precipitating 110 mg. of yellow solids, M.P. 218–227°; $\lambda_{max.}$ 238 mμ (ε 14,600), 260 mμ (ε 9,550, shoulder), and 300 mμ (ε 5,020);

$\lambda_{max.}^{KBr}$ 2.87, 3.02, 3.15, 6.15, 6.40, 6.95, 9.49μ, etc.

*Analysis.*—Calcd. for $C_{21}H_{30}ON_4 \cdot H_2O$: C, 67.71; H, 8.66; N, 15.04. Found: C, 68.55; H, 8.63; N, 14.81.

EXAMPLE 5

*17β-acetoxy-5α-androstano-[3,2-d]-2'6'-diaminopyrimidine*

Heat a mixture of 2.0 g. of 17β-acetoxy-5α-androstan-3-one and 1.0 g. of cyanoguanidine in a test tube at 250° for about 30 minutes under nitrogen with vigorous stirring. The mixture melts after about 3 minutes, but solidifies after about 20 minutes of heating. Cool the melt and extract the solids obtained twice with 500 ml. portions of hot water. Follow this extraction with treatment with boiling benzene in a plurality of portions. The benzene extracts are dissolved in hot water which has been acidified to pH 1 with dilute HCl and filter the residue. Cool the filtrate to 0° and adjust to pH 9 with a base such as ammonium hydroxide to precipitate the product of this example.

EXAMPLE 6

*17β-benzolyoxy-5α-androstano-[3,2-d]-2',6'-diaminopyrimidine*

Heat a mixture of 2.0 g. of 17β-benzoyloxy-5α-androstan-3-one and 1.0 g. of cyanoguanidine in a test tube at about 250° for about 30 minutes under nitrogen accompanied with vigorous stirring. The mixture melts and is cooled and extracted twice with 500 ml. portions of hot water. Follow this extraction by treatment with boiling benzene which extracts are dissolved in hot water which has been acidified with dilute HCl to a pH of about 1, and filter the residue. Cool the filtrate to 0° and adjust to pH 9 with a base such as ammonium hydroxide to precipitate the product of this example.

What is claimed is:
1. 5α-cholestano-[3,2-d]-2',6'-diaminopyrimidine.

References Cited

UNITED STATES PATENTS

| | | | |
|---|---|---|---|
| 2,999,092 | 9/1961 | Colton et al. | 260—239.5 |
| 3,026,317 | 3/1962 | Ringold et al. | 260—239.5 |

LEWIS GOTTS, *Primary Examiner.*

H. FRENCH, *Assistant Examiner.*